(No Model.)
E. V. V. DE P. DESDOUITS.
SELF ACTING BRAKE.
No. 354,399.  Patented Dec. 14, 1886.
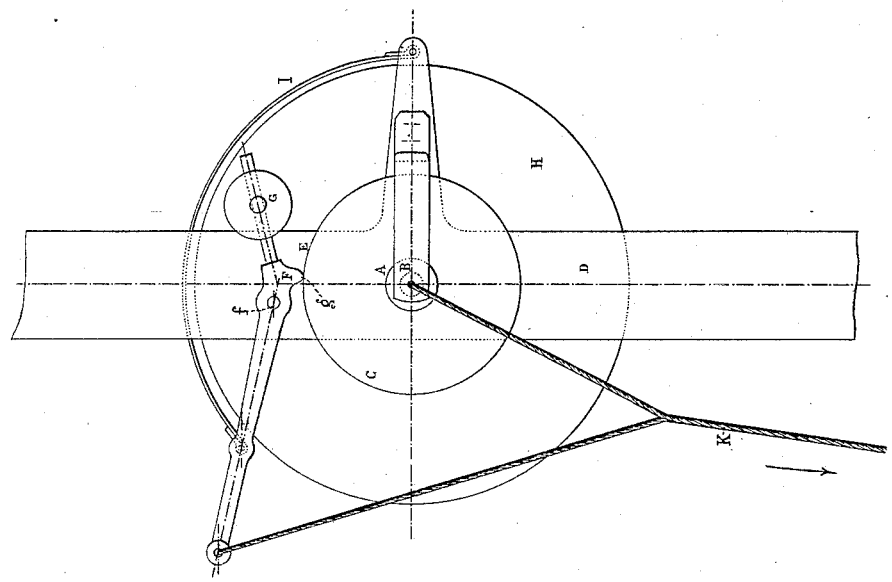
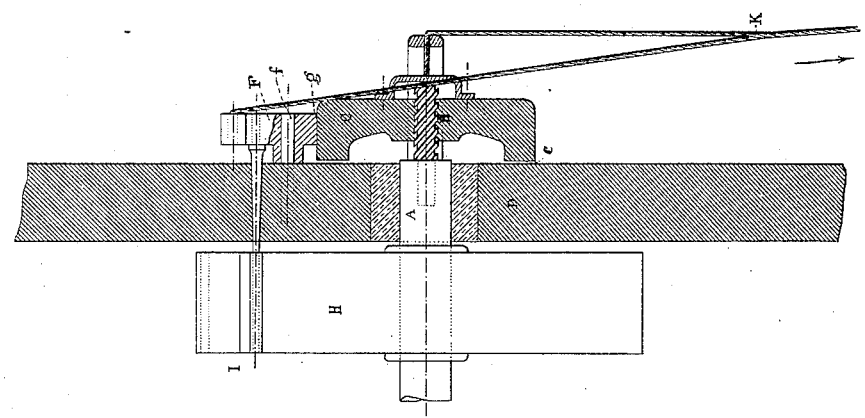
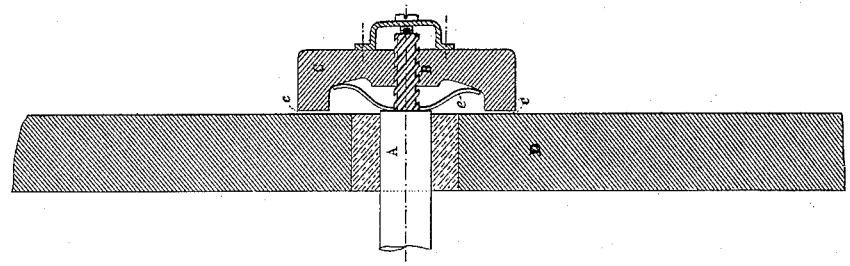
Witnesses:  Inventor

UNITED STATES PATENT OFFICE.

EUSÈBE VICTOR VINCENT DE PAUL DESDOUITS, OF PARIS, FRANCE.

SELF-ACTING BRAKE.

SPECIFICATION forming part of Letters Patent No. 354,399, dated December 14, 1886.

Application filed October 1, 1886. Serial No. 215,068. (No model.) Patented in France December 9, 1885, No. 172,808, and in Belgium December 21, 1885, No. 71,310.

*To all whom it may concern:*

Be it known that I, EUSÈBE VICTOR VINCENT DE PAUL DESDOUITS, a citizen of France, residing at Paris, in the Department of the Seine, France, have invented new and useful Improvements in Self-Acting Brakes for Hoisting and other Machinery, (which has been patented to me in France by Patent No. 172,808, dated December 9, 1885, and in Belgium by Patent No. 71,310, dated December 21, 1885,) of which the following is a specification.

This invention has reference to the construction of self-acting brakes or controlling devices for application particularly to hoisting apparatus—such as cranes, winches, pulley-blocks, lifts, &c.

The object of the invention is the construction of a simple and effective device which will control the speed of the shaft in lowering the weight or load and check it instantly should the restraining force of the apparatus be relaxed or prove insufficient. This object is attained by the arrangements hereinafter described.

Upon the principal shaft, or upon one of the auxiliary shafts of the hoisting or other apparatus, is placed a worm or screw with an elongated thread. This screw is concentric with the shaft and rotates therewith. Upon this screw is mounted a disk or nut having an internal thread of corresponding pitch. So long as the speed of the shaft is uniform the disk or nut will turn with the shaft; but should the speed of the latter be suddenly accelerated through any cause the inertia of the disk will retard it, and by the action of the screw the disk will move longitudinally of the shaft until it makes contact with a stationary part of the apparatus, thereby checking the shaft. A light spring or other suitable means may be used to prevent the disk being brought into action by slight irregularities in the speed of the shaft. The friction or contact surface of the disk may be conical, and in this case the diameter of the disk may be reduced. The inertia of the disk may be increased by the pressure of a weight or spring, or in any suitable way.

When desired, the automatic brake can be combined with an ordinary hand friction-brake and connected with the operating-lever thereof in such manner that when said lever is operated to apply the brake the disk will be held away from the stationary part with which it makes contact in stopping the machine.

In the accompanying drawings, which form a part of this specification, Figure 1 is a vertical section of so much of a hoisting apparatus as necessary to illustrate the invention; Fig. 2, a similar view showing a somewhat different form of apparatus, and Fig. 3 an elevation of the apparatus shown in Fig. 2.

A represents the shaft of a hoisting or other apparatus to which the brake is to be applied. On the end of the shaft A is a screw or worm, B, securely fixed to said shaft concentrically therewith. As indicated in the drawings, the thread of screw B has a long pitch. On the screw is mounted a disk, C, having friction-surfaces $c$ adjacent to a stationary part, D, of the apparatus. The weight and size of disk C and the pitch of screw B are such that when shaft A rotates regularly at a normal or moderate speed the disk will turn with the shaft; but should the speed of the shaft suddenly increase beyond a safe rate the inertia of the disk, due to its weight and size, would retard it sufficiently to shift its position lengthwise of the screw and bring the friction-surfaces $c$ against the upright D, thus instantly checking the shaft. Of course when the shaft rotates in the opposite direction—*i. e.*, to raise a load—the automatic brake does not act.

As shown in Fig. 1, a light spring, $e$, is arranged to bear against disk C, tending to keep it away from the surface of the upright D.

In Figs. 2 and 3 a lever, F, is shown pivoted at $f$ to the upright D and carrying an adjustable weight, G. The lever also has a shoe, $g$, which bears upon the periphery of the disk C with greater or less pressure, according to the position of the weight G on the arm of lever F. This weight increases the inertia of the disk and causes it to act more promptly than it otherwise would. These figures (2 and 3) also show the automatic brake combined with the ordinary hand-brake.

H is the brake-wheel on the shaft A, and I is the strap connected at one end to the lever F, to which is attached an operating-cord, K. This cord has two branches, one of which is connected with the disk C in such way that when the cord is pulled the disk will be held out of contact with surface D.

If it be desired to release the shaft A from the control of the automatic brake and permit a rapid descent of the load, the attendant pulls on cord K. The first effect of this is to lift the projection $g$ out of contact with the disk. Further depression of lever F brings the strap I in contact with wheel H, by which means the shaft can now be controlled. The weight G may, of course, be carried on a separate lever from that which operates the hand-brake; but the construction shown is specially advantageous.

The automatic brake, while applicable more particularly to hoisting apparatus, may obviously be applied to other purposes, as to tightening wires or cables. It is obvious, moreover, that the details of construction may be modified, and that parts of the invention may be used separately without departing from the spirit of the invention.

I claim—

1. The combination, with the shaft of a hoisting or other apparatus, of a screw or worm and a disk or nut mounted thereon, and having a friction-surface for bearing against a stationary part of the apparatus, substantially as and for the purposes set forth.

2. In a hoisting apparatus, an automatic brake for regulating the descent of a load, said brake consisting of a disk or nut mounted on a screw carried by one of the shafts of the apparatus and having a thread of long pitch, said disk or nut having a friction-surface adjacent to a stationary part of the apparatus, substantially as described.

3. The combination of the shaft, the screw, the disk having a friction-surface and constituting a brake for said shaft, and means—such as a weight—for exerting pressure on said disk to increase its inertia, substantially as described.

4. The combination, with the shaft, the screw, and the disk constituting an automatic brake, of the lever bearing on said disk and the adjustable weight carried by said lever, substantially as described.

5. The combination of the shaft, the screw, the disk, constituting an automatic brake, the hand-brake, and its operating-lever, the disk and hand-brake being connected together, so that the former is held out of action when the latter is applied, substantially as described.

6. The combination of the shaft, the screw, the automatic brake, comprising a disk mounted on said screw, the hand-brake, its operating-lever having a projection normally bearing on said disk, an adjustable weight carried by an arm of said lever, and an operating-cord attached to said lever, so that said projection is raised from said disk when the hand-brake is applied, as set forth.

In testimony whereof I have hereunto set my hand in the presence of two subscribing witnesses.

EUSÈBE VICTOR VINCENT DE PAUL DESDOUITS.

Witnesses:
  H. JOSSE,
  A. ROUSSEL.